3,391,571
APPARATUS FOR AND METHOD OF DETERMIN-
ING THE OPERATIONAL EFFECTIVENESS OF
VIBRATORY-TYPE DEVICES
Frederic R. Johanson, Columbus, Ohio, assignor to The
Jaeger Machine Company, Columbus, Ohio, a corpora-
tion of Ohio
Filed Apr. 22, 1965, Ser. No. 449,989
12 Claims. (Cl. 73—67)

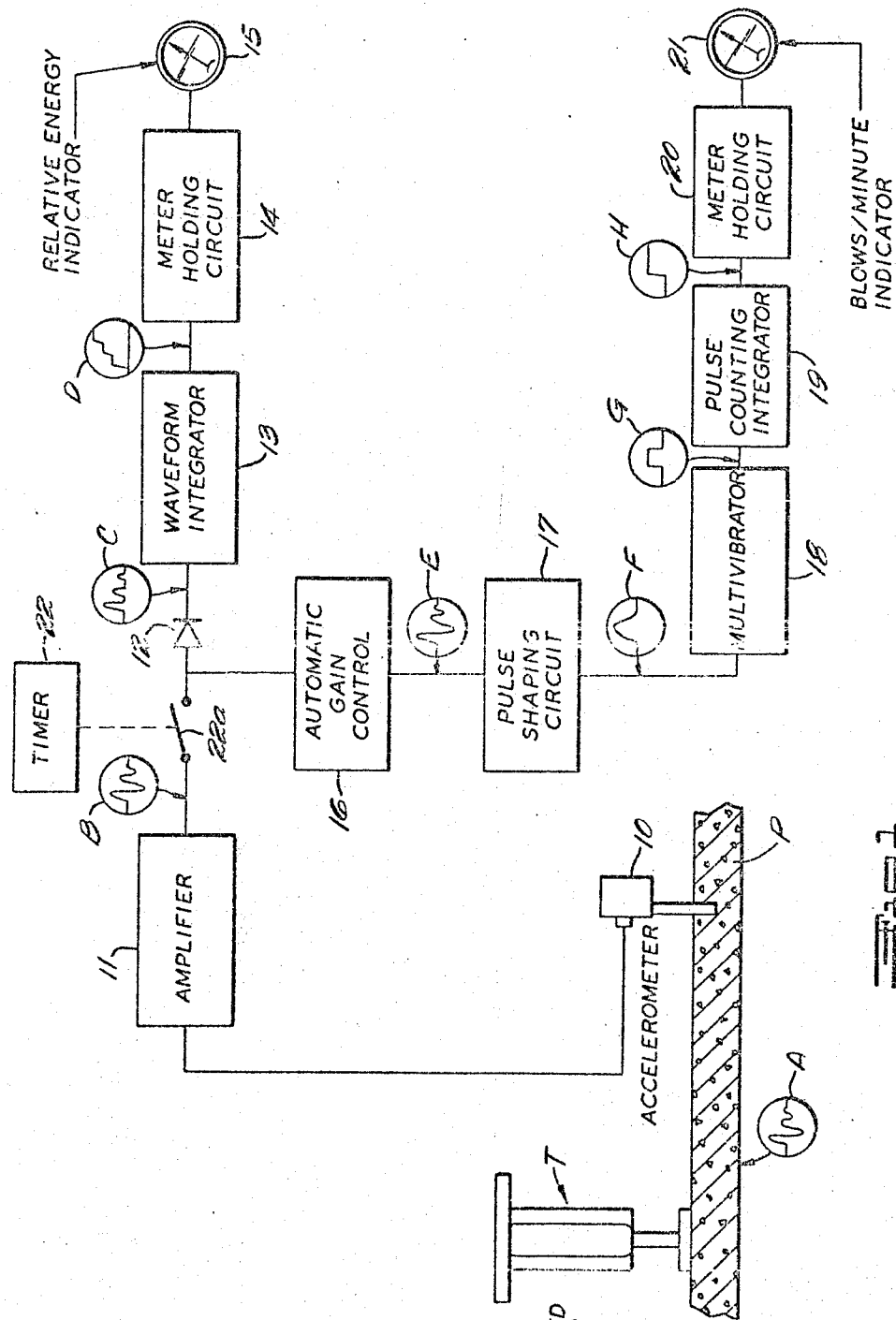

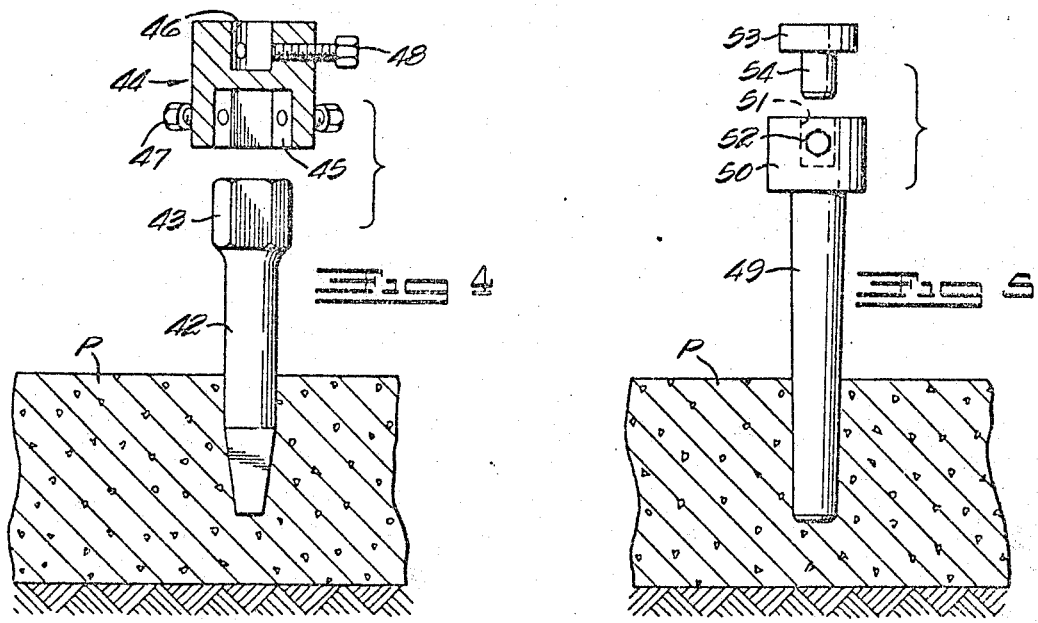
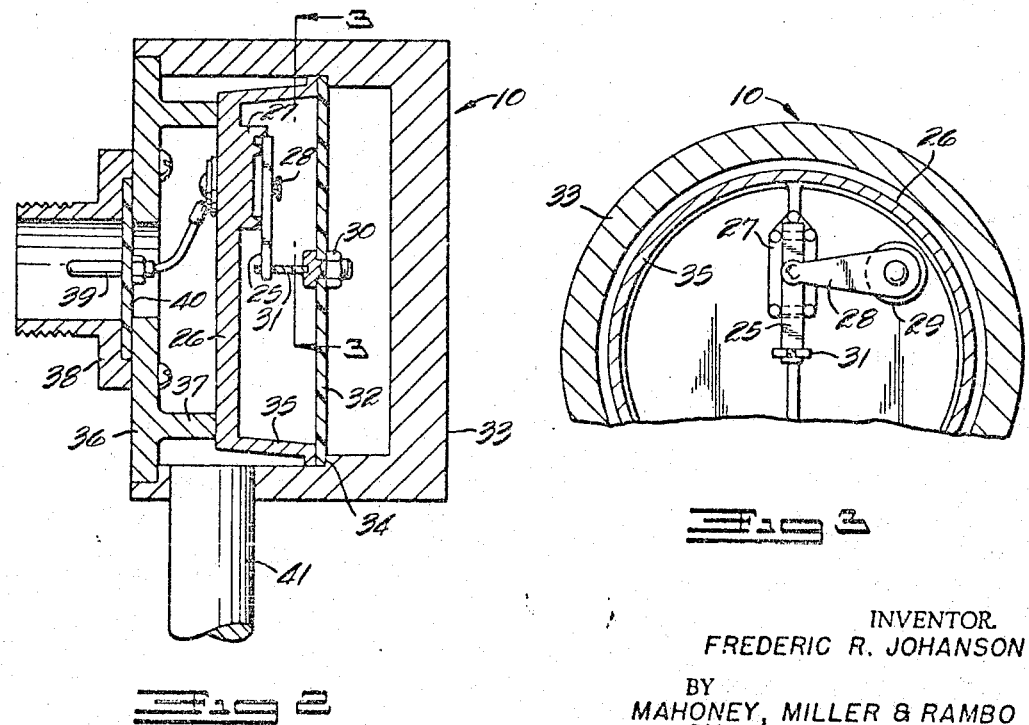

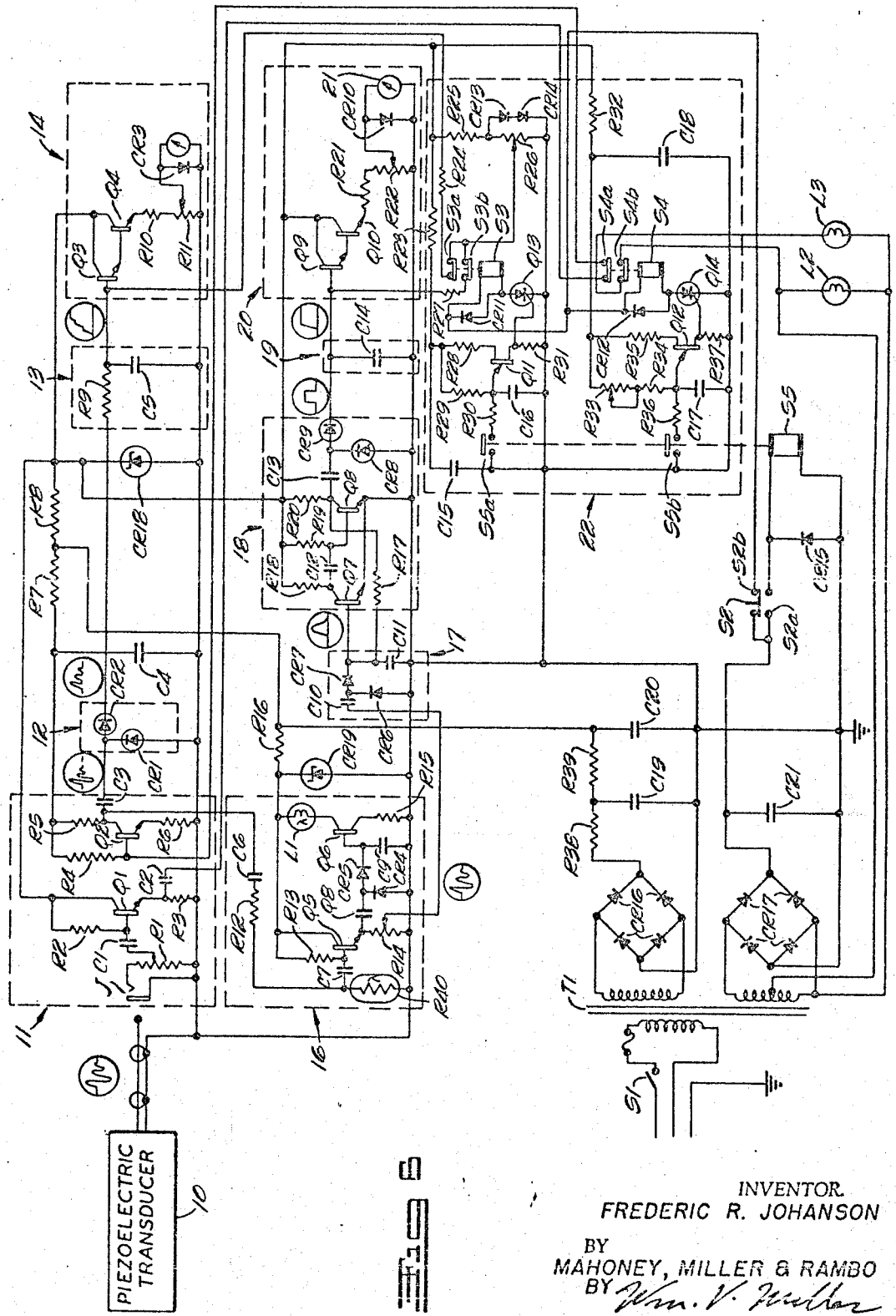

ABSTRACT OF THE DISCLOSURE

Mechanical oscillations produced by a vibratory-type device under test are detected by an accelerometer providing an electrical signal indicative of the energy output and cyclic rate of operation of the device. The accelerometer is mechanically coupled with the device through a test body and is electrically connected with an electronic circuit which analyzes the output signal and provides a visual readout as to energy output of the device and cyclic rate of operation.

---

This invention relates, in general, to apparatus for determining the operational effectiveness of vibratory-type devices and to a testing procedure for determining the effectiveness of operation of the device under operating conditions. It relates, more specifically, to a testing instrument which is responsive to the mechanical oscillations produced by vibratory-type device under test and adapted to convert the mechanical oscillations to a readout indicative of the energy output of the device and its frequency of operation. This invention also specifically relates to a testing procedure for determining the operational effectiveness of a vibratory-type device relative to a standard test device while the devices are operated in association with a test body.

This invention is designed primarily for utilization in the testing of vibratory-type devices such as the well-known air-powered tampers or hammers utilized in earth-compacting or pavement-constructing work. The vibratory-type devices of this particular type incorporate an air valve mechanism for automatically controlling the flow of compressed air from a suitable pressurized air supply to impart a reciprocatory motion to an attached tool. Such devices are subject to wear over prolonged periods of operation and necessitate maintenance or other corrective action to maintain a satisfactory operational effectiveness. Periodic maintenance performed at desired intervals will reduce overall maintenance costs as minor repairs performed at the proper time will prolong the operational life of the device and reduce the necessity of major repairs and maintenance. Prior to the present invention, the determination of the proper time for performing inspections for minor maintenance or repairs has been empirical and dependent on the experience and knowledge of the person operating the device or an assigned inspector. As a result, maintenance of the vibratory-type devices has normally been delayed until such time as the device has become inoperative or noticeably operationally ineffective and, as a consequence, is in need of costly repairs requiring replacement of major parts.

It is the primary object of this invention to provide an apparatus which is capable of determining the operational effectiveness of a vibratory-type device and thereby provides an indication of the necessity of repair or maintenance.

It is another important object of this invention to provide a testing procedure for determining the relative effectiveness of a vibratory-type device.

It is another object of this invention to provide a testing instrument for determining the operational effectiveness of a vibratory-type device and which provides an indication of the relative energy output of the device and its cyclic rate of operation.

It is also an object of this invention to provide a testing instrument and procedure for determining the operational effectiveness of a vibratory-type device and which may be utilized in the field for determining the timeliness of the performance of maintenance inspections and repairs.

These and other objects and advantaegs of the present invention will be readily apparent from the following detailed description of an embodiment thereof and the accompanying drawings.

In the drawings:

FIGURE 1 is a diagrammatic representation of a testing instrument embodying the present invention and illustrating the utilization thereof in determining the operational effectiveness of a vibratory-type device.

FIGURE 2 is an enlarged, axial sectional view of the accelerometer of the instrument utilized for detecting the mechanical oscillations produced by the device and converting these oscillations to a related electrical signal.

FIGURE 3 is a transverse sectional view taken along line 3—3 of FIGURE 2.

FIGURE 4 is a sectional view of apparatus for mechanically coupling the accelerometer to the test body.

FIGURE 5 is a sectional view illustrating a modified apparatus for mechanically coupling the accelerometer to a test body.

FIGURE 6 is a schematic diagram of the electrical circuit of the testing instrument.

FIGURE 1 illustrates the basic components of the embodiment of the testing instrument and the technique for the utilization thereof in determining the operational effectiveness of a vibratory-type device. As is diagrammatically illustrated in FIGURE 1, an accelerometer 10 of the test instrument is mechanically coupled to a vibratory-type device, such as an air-powered tamper, to provide an electrical input signal to the test instrument. This electrical input signal is related to the energy output of the tool T and to its cyclic frequency of operation. Through the electronic circuitry of the testing instrument, which will be described in detail hereinafter, the electrical input signal provided by the accelerometer 10 is transformed to a visual readout for each of the two independent factors under consideration. In this instance, a meter is diagrammatically shown for indicating the relative energy output of the device and its rate of operation designated as blows per minute.

In the operation of a vibratory-type device, such as an air-powered tamper, the device imparts a continuous series of blows to the body on which the work is to be performed. This typical operation is illustrated in FIGURE 1 with the tool T shown disposed in mechanical relationship to a short section of a densely compacted road surface or pavement P. The densely compacted road surface transmits each blow from the point of impact by the tool T as a pulse-form mechanical oscillation having an oscillatory waveform. The cyclic frequency of operation of the tool T determines the frequency of the formation of the pulses in the pavement P and the specific waveforms of each pulse will be related to the energy transferred by the tool T to the pavement P or the output energy of the tool. The accelerometer 10 is adapted to detect the mechanical oscillations transmitted through the pavement P and convert the mechanical oscillations to a related electrical signal. This electrical signal will also be of pulse-form having an oscillatory waveform and, for the period of operation, the tool T will provide a continuous train of pulses having an amplitude-modulated, oscillatory waveform. By counting the number of pulses occurring during a predetermined interval of time, it is possible to determine the cyclic frequency of operation of the tool. Each pulse of mechanical energy transmitted by the pavement P may have a waveform such as is illustrated graphically in circle A. This waveform is seen to be oscillatory in nature and is amplitude modulated. Determining the area under the waveform itself provides a relative indication of the energy transmitted by the air-powered tamper to the pavement P. This energy indication is only relative as the mechanical coupling of the tool T relative to the pavement P and the mechanical oscillation transmitting characteristics of the pavement material will affect the amplitude and waveform of the mechanical oscillation transmitted to the accelerometer 10.

Although a single application of the apparatus in the testing of a single vibratory-type device has been illustrated, it is to be understood that the instrument and procedure may be readily adapted to other applications and is useful in determining the operational effectiveness of other devices of a similar type. For example, the pavement P may be formed from concrete and the tool T may be operating a breaking point or chisel in association with the pavement. In certain applications the pavement P may be replaced by a steel sheet or other metallic material. Also, a densely-compacted, granular material may provide a suitable transmission of the mechanical vibrations to the accelerometer. In each case, the essential characteristic of the test body, as represented by the pavement P, is that the material be capable of transmitting mechanical oscillations over a short distance with relatively little attenuation.

The electrical signal thus produced by the accelerometer 10 is first amplified by a suitable electronic amplifier 11 at the initial input stage to the analytical electronic circuitry. This circuitry is divided into two major circuit sections having the respective independent functions of determining the relative energy output of the tool T and the cyclic frequency of operation. The circuit section for determining the relative energy comprises a rectifier, diagrammatically illustrated at 12, a waveform integrator 13, a meter-holding circuit 14, and an indicating meter or readout device 15. The frequency determining circuit section includes the basic components of an automatic gain control circuit 16, a pulse-shaping circuit 17, a multivibrator 18, a pulse-counting integrator 19, a meter-holding circuit 20, and an indicating or readout device 21. Since each function is dependent on a time base for purposes of comparison, an electronic timer 22 and associated switch 22a are incorporated in the circuit between the amplifier 11 and the inputs to the two sections and is operative to provide a fixed time interval over which the circuit sections will operate to provide a predetermined time base.

The electrical signals received from the amplifier 11 by each of the circuits will, therefore, comprise a series of amplitude modulated pulses having an oscillatory waveform and which occur during a predetermined time interval. As indicated diagrammatically in circle B, each electrical signal pulse is seen to be substantially identical to the mechanical oscillations pulse and may include positive and negative polarity voltage components. This oscillatory signal is fed through the rectifier device 12 or other unidirectional circuit means and provides a signal pulse having only voltage components of a single polarity. A waveform integrator 13 acts on the rectified signal, which is illustrated in the circle C, to electronically determine the area beneath the individual pulses within a single pulse and provides an output having only a direct current component total, as indicated at D. The meter holding circuit 14 is operative over the timed cycle as determined by the timer 22 to transmit the cumulative direct current output signal to the meter 15. This direct current component as transmitted to the meter 15 provides a relative indication of the energy output of the vibratory-type device or the air-powered tamper T.

The second circuit, which provides a frequency indication, receives the signal from the amplifier 11 with the signal being operated on initially by an automatic gain control circuit 16 which has an output of oscillatory waveform but having a constant amplitude, as is indicated in circle E, regardless of the amplitude of the signal received. Each pulse from the automatic gain control is fed through the pulse shaping circuit 17 which converts the constant amplitude, oscillatory waveform to a single pulse having a single polarity. The resultant output of the pulse shaping circuit 17 is indicated at F and is of an amplitude sufficient for triggering the multivibrator circuit 18. Although the output of the pulse shaping circuit may be variable as between any two pulses, the output of the multivibrator eliminates any nonuniformity as between any two pulses and provides a pulse output having a square waveform, as indicated at G. Each square wave pulse will thus have an amplitude of constant magnitude irrespective of the amplitude of the input waveform to the circuit or the cyclic frequency of operation of the tool T. The pulse-counting integrator 19 receives the series of constant amplitude pulses from the multivibrator 18 and provides an output signal related to the cumulative total of the pulses received over the predetermined time interval as determined by the timer 22. This output signal is diagrammatically illustrated at H and forms the input to the meter holding circuit 20 which drives the meter 21 and indicates the cycles of operation. This meter 21 may be calibrated to directly indicate the number of operations that the tamper has performed during the specific time interval. By choosing a suitable time base and through appropriate calibration, the meter 21 will provide a direct indication.

The testing procedure of this invention provides a relative determination of the operational effectiveness of the vibratory device being tested. This is accomplished by operating the device to be tested in association with a suitable test body, which may be a section of pavement P, as illustrated and determining the relative energy output and the cyclic frequency of operation. These factors may be advantageously ascertained by the test apparatus briefly described hereinbefore. A second vibratory device of the same type is then operated in association with the same test body and the energy output and the cyclic frequency of operation of the second device ascertained. Utilizing the same instrumentation will therefore provide a relative indication of the operation of the two devices. When the second device is selected to be in good operating condition, it is thus possible to relatively determine the condition of the device being tested and accordingly ascertain the necessity of maintenance or repairs. This procedure provides an accurate indication of the device's condition and eliminates the necessity of tear-down type inspections or reliance on operator experience.

In the present embodiment of the test instrument, the accelerometer 10 comprises an electromechanical transducer incorporated in a novel mechanical structure for the support thereof and the advantageous detection of the mechanical vibrations or oscillations produced in the test body or pavement P. The detailed construction of the accelerometer 10 is clearly illustrated in FIGURES 2 and 3. In this embodiment, the electromechanical transducing element comprises a piezoelectric crystal 25 mounted so as to be responsive to a mechanical displacing force applied thereto. In this embodiment, the piezoelectric crystal 25 is secured to a substantially rigid supporting bracket 26 by means of a mounting lug 27 which also forms one terminal of the electrical output circuit. The crystal 25 is of elongated bar form and is supported by the mounting lug 27 in cantilevered relationship and is, therefore, particularly responsive to bending forces. Clamping the crystal 25 to the mounting lug 27 is a resilient spring finger 28 which is secured to the supporting bracket 26 by an upstanding stud 29 formed therewith. The spring finger 28 is formed from an electrically conducting material and is electrically insulated from the supporting bracket 26 and thereby forms the second electrical contact with the crystal 25. A weight 30 is connected to the free end of the crystal 25 by a suitable connector link 31 to increase the effectiveness of the mechanical displacing forces on the crystal. Supporting the weight 30 in the desired relationship to the crystal 25 is a flexible diaphragm 32. Both the supporting bracket 26 and the diaphragm 32 are carried within a protective housing 33 having a cylindrical wall and closing end plate. An annular lip 34 is formed on the interior cylindrical wall of the housing 33 and supports the circular diaphragm 32 and the supporting bracket 26. In the illustrated embodiment, the supporting bracket 26 is also of circular shape and is provided with a peripheral flange 35 having a terminal edge adapted to overlie the annular lip 34 and clamp the marginal edge of the diaphragm 32 therebetween. Completing the housing assembly is a back closure plate 36 which is adapted to be press-fitted into the rear opening of the housing 33 and is formed with projecting lugs 37 that bear against the supporting bracket 26. When properly assembled with the housing 33, the back plate 36 maintains the supporting bracket 26 in fixed position within the housing.

Secured to the exterior surface of the back closure plate 36 is a suitable electrical connector 38 which is of the type having a pair of pin-shaped terminals 39, only one of which is shown. One of the terminals 39 is electrically connected to the supporting bracket 26 while the second terminal is connected to the spring finger 28. Both of the terminal pins 39 are mounted on an insulating board 40 which forms a part of the connector 38. The housing 33 with the back closure plate 36 and associated electrical connector 38 forms a completely sealed unit for the protection of the piezoelectric crystal 25 permitting utilization of the testing instrument under adverse test conditions which may be encountered when utilizing the instrument in the field.

To facilitate the mechanical connection of the transducer or accelerometer to the test body or pavement P, an elongated mounting pin 41 is rigidly secured to the housing 33. The mounting pin 41 is of circular cross section and may be secured to the housing 33 as by press fit. With the transducer or accelerometer 10 mechanically coupled to the pavement P, the vibration transmitted through the pavement will also be transmitted to the housing 33 and the supporting bracket 26 for the piezoelectric crystal 25. Consequently, the crystal 25 will be oscillated in the same manner as the waveform of the vibration oscillations. By appropriately positioning the crystal 25 to dispose the preferred axis of bending for most effective generation of an electrical charge in a plane transverse to the direction of movement of the oscillations, the crystal 25 will provide an electrical voltage signal at the output terminals 39. The bending forces resultant from the mechanical oscillation is enhanced by the weight 30 supported by the diaphragm 32. Since the mechanical oscillations are represented by a change in direction of movement, the mass of the weight 30 will be resistive to this change and thereby present a force acting on the free, unsupported end of the crystal 25 in addition to the mass of the unsupported portion of the crystal and the diaphragm.

The mechanical connection of the accelerometer 10 to the pavement P is further facilitated by the connector adaptors illustrated in FIGURES 4 and 5. The adaptor illustrated in FIGURE 4 comprises a chisel-pointed breaker tool designed for utilization with the air-powered tamper or hammer. This tool is formed with a hexagonal head portion 43 which is adapted to be detachably secured to the actuating mechanism of the device. The chisel-pointed tool 42 is assembled with the actuating mechanism and is driven into the pavement P to a desired depth. This operation may be accomplished by the same device which is to be subsequently tested. Driving the tool 42 into the pavement in this manner securely seats the tool in fixed, mechanically-coupled relationship to the pavement material P. In the case of a concrete-type pavement, this method is particularly effective. The desired depth to which the tool is driven in the pavement has been found to be substantially greater than the mid point but not so great as to cause penetration of the tool point through the opposite surface of the pavement. An adaptor coupling 44 is provided to complete the connection of the accelerometer 10 to the tool 42. The coupling 44 comprises a short, cylindrical body having a socket 45 which may be of hexagonal cross section formed in the one end and a cylindrical socket 46 formed in the opposite end. The hexagonal socket 45 is formed to receive the head 43 of the chisel-pointed tool and a number of setscrews 47 are provided to secure the adaptor coupling 44 to the tool 42. Similarly, the cylindrical socket 46 is formed to receive the mounting pin 41 of the transducer 10 and is provided with a number of setscrews 48 to complete the fixed mechanical connection. After driving the chisel-pointed tool 42 into the pavement, the actuating mechanism is disassembled therefrom and the adaptor coupling 44 secured to the head 43. The mounting pin 41 of the accelerometer 10 is then inserted in the cylindrical socket 46 and the setscrews 48 tightened to secure the accelerometer in place. The preferred installation practice requires that the tool 42 be driven substantially vertically into the pavement to support the accelerometer in the position shown in FIGURE 2. The crystal 25 will thus be disposed in a vertical plane and transverse to the direction of movement of the mechanical oscillations in the pavement. After completing the installation of the tool point 42 and the transducer 10, the air powered device utilized in driving the tool point 42 into the pavement may be reassembled with another suitable tool for performance of the test, if this device is the one to be tested.

The modified connector adaptor shown in FIGURE 5 is specifically designed for utilization with paving materials of the asphaltic type or densely compacted granular materials. This adaptor comprises an elongated, tapered shaft 49 having an adaptor coupling 50 formed at one end thereof. The shaft 49 is designed to be driven into the pavement material in the same manner as the tool 42 or in a preformed hole; however, the shaft 49 may be driven into position by a hammer rather than the actuating mechanism of an air-powered tamper or hammer. A cylindrical socket 51 is formed in the adaptor coupling for receiving the mounting pin 41 of the accelerometer 10 and a number of setscrews 52 are provided to secure the mounting pin in the socket. To prevent damage to the adaptor coupling 50 when a hammer is utilized in driving the shaft 49 into the pavement, a drive cap 53 may be provided. The drive cap 53 includes a contacting head portion and a pin 54 which is adapted to fit within the socket 51. Prior to driving the device into the pavement P, the drive cap 53 would be assembled with the adaptor coupling and would absorb the blows from the hammer. Upon completion of the positioning of the adaptor, the drive cap 53 would be removed and the accelerometer 10 would be assembled with the adaptor coupling 50.

The electrical circuit of the present embodiment of the testing instrument is illustrated in detail in the schematic diagram of FIGURE 6. All of the components or elements shown in the diagram with the exception of the piezoelectric transducer in the accelerometer 10 are incorporated in a suitable instrument housing which is not shown. The piezoelectric transducer is provided with a suitable flexible cable to permit versatile application of the apparatus. Preferably, the circuits are designed with solid state devices to minimize the physical structure of the instrument and to maintain the power requirements within specified limits to enhance the portability of the instrument. The circuit shown in FIGURE 6 includes a direct current power supply suitable for operation of the designed solid state components with the power supply being adapted for connection to a standard conventional alternating current power source having a voltage of 115 volts. A pair of full wave, rectifier bridge circuits are driven by a transformer T1 having a primary winding which may be connected to a suitable power supply through an "on-off" switch S1. Each of the rectifier bridge circuits includes four semiconductor diodes CR16 and CR17 which are connected in the well-known manner to provide a full wave rectifier bridge circuit. The output of each rectifier device is connected to a suitable filter network with the respective outputs in the present embodiment being of the order of 40 volts and 15 volts. Improved performance is obtained by means of the Zener diodes CR18 and CR19 which are connected in the power inputs to the respective circuit sections and regulate the voltage supply. It will be apparent that the direct current power supply illustrated may be replaced by suitable battery devices to enhance the portability of the instrument. It will also be apparent that the two devices may be replaced by a single rectifier or battery power source for specific circuit components.

The amplifier circuit 11 comprises two transistorized amplifier stages which are of conventional design. The two stages are coupled through the coupling capacitor C2 and the contacts S4a of a relay device S4. The relay device S4 is incorporated in the timer mechanism 22, which timer will be described in further detail hereinafter, and accordingly assists in the determination of the testing interval. A connector jack J is provided to facilitate the attachment or disengagement of the piezoelectric transducer accelerometer and the instrument circuit. An input terminal of the jack is connected through a potentiometer R1 to the input of the first amplifier stage which comprises transistor Q1. The collector output of the second stage of amplification which comprises transistor Q2 is fed through the respective coupling capacitors C3 and C6 to the two sections of the circuit.

Connected to the coupling capacitor C3 is the rectifier 12 which includes a pair of silicon rectifier diodes CR1 and CR2. These two diodes are connected to permit passage of all positive going pulses to the waveform integrator 13 and to bypass all negative-going pulses of the amplified input voltage signal. The waveform integrator 13 is of the well-known basic form comprising an integrating capacitor C5 with an input resistance R9 and integrates the transmitted waveform through accumulation of the electrical charge. The electrical charge will thus form a cumulative direct current, output voltage signal which is transmitted to the meter-holding circuit and is related to the energy of the electrical signal. This direct current output voltage signal is also related to the energy output of the vibratory device being tested and is, therefore, indicative of its operational effectiveness. Although a sensitive (moving coil type) meter movement may be utilized to provide a visual readout of the integrated signal, such a conventional-type meter movement will readily discharge the integrating capacitor C5 and provide an erroneous reading. To avoid this difficulty, a high impedance input circuit to the meter is provided by the meter holding circuit. This high impedance input to the meter is provided by a pair of transistors Q3 and Q4 connected as shown in the schematic diagram.

The second circuit, which provides the indication of the frequency of operation of the vibratory-type device, includes the automatic gain control circuit 16 which is coupled to the output of the amplifier stages through the coupling capacitor C6. This circuit is of conventional design and utilizes a photoconductive cell to effect the automatic gain control. The photoconductive cell comprises the variable resistance element R40 and the voltage responsive, variable illumination lamp L1. The resistance R40 and lamp L1 are assembled in a single unit which is commercially available and the light from the lamp will be incident on the resistance element R40 and a variation of the illumination thus incident will effect a variation in the resistance R40. Since the lamp L1 is connected through the transistor Q6 to the input circuit voltage of the gain control, the incident illumination will be a function of the input voltage. Through appropriate design of the circuitry, this change in voltage provides the necessary feeback to control the gain of this circuit and maintain a constant amplitude output signal. The slider of the potentiometer R14 connected to the emitter terminal of the transistor Q5 forms the output of the automatic gain control circuit 16.

Connected to the output of the automatic gain control circuit 16 is the pulse-shaping circuit 17. This pulse-shaping circuit is designed to form a single, positive-going voltage pulse for each input pulse of oscillatory waveform. This output pulse from the pulse-shaping circuit 17 is applied to the input of the multivibrator circuit 18 which is the base terminal of the transistor Q7. The multivibrator circuit 18 is of well-known design, known as the monostable type, and the input pulse triggers the circuit to the second of its conducting stages of operation and forms a square wave voltage pulse at its output terminal.

The series of square wave pulses provided by the multivibrator circuit 18 form the input to the pulse-counting integrator circuit 19. This circuit, comprising an integrating capacitor C14, accumulates a charge over the period of time during which the counting interval takes place and forms an output having a direct current component proportional to the number of square wave pulses received and is related to the cyclic frequency of operation of the vibratory device. This cumulative direct current total thus forms the output of the integrator and is the input signal to the meter holding circuit 20 and its associated meter 21 which may be calibrated to provide a direct readout of blows per minute. This meter-holding circuit and its connection to the meter 21 is of a design similar to that previously described with reference to the relative energy measuring circuit to form a high input impedance which prevents discharge of the integrating capacitor C14 during the time of measurement.

The timing of the test interval effected by an electronic timer circuit 22. This circuit includes two sections with one of the sections including the relay device S4 which operates to connect the two stages of the amplifier circuit 11 for transmission of the input signal. The second timer circuit section also includes a relay device designated S3 which functions to discharge the integrating capacitors C5 and C14 of the respective integrator circuits prior to initiation of the integrating time interval. One set of normally closed contacts S3a connects a discharge resistor R24 to the output terminal of the integrating capacitor C5 of the waveform integrator 13 to a voltage reference circuit comprising the potentiometer R26 and two series connected diodes CR13 and CR14 which are connected across the potentiometer and provide a constant voltage. The potentiometer R26 is adjusted to provide a reference potential of approximately 1 volt. Similarly, the normally open contacts S3b connect a discharge resistance R27 to the output terminal of the integrating capacitor C14 of the pulse counting integrator 19. The contacts S3b also connect with the slider of potentiomeer R26 to provide the required reference voltage. It has been found desirable to utilize a fixed reference voltage in discharging of the capacitors C5 and C14 to provide the offset voltage necessary to bias the transistors Q3, Q4 and Q9, Q10 on the verge of emitter current flow.

The actuating coils of both relays S3 and S4 are controlled by silicon-controlled rectifier devices Q13 and Q14, respectively, which are, in turn, triggered at their respective gating terminals by an appropriately timed timer circuit. Both of the triggering circuits are designed to trigger the SCR's Q13 and Q14 to a conducting state to terminate the timing interval. During "Off-Duty" operation of the instrument, both SCR's Q13 and Q14 are conducting and thereby the respective actuating coil of the relay devices S3 and S4 are energized and the respective contacts are open. Discharging the respective timing capacitors C16 and C17 and disconnecting the power supply from relay devices S3 and S4 result in switching of the silicon-controlled rectifiers Q13 and Q14 to a nonconducting state and the respective relay contacts will close. Discharge of each timing capacitor, C16 and C17, is effected through the discharge resistors R30 and R36 which may be connected to circuit's ground terminal by means of a relay device S5 and its associated normally open contacts S5a and S5b. The contacts S5a and S5b are connected to the respective resistance R30 and R36 to connect the resistance to the ground terminal. Closing of the contacts will, therefore, cause discharge of the timing capacitors C16 and C17 through the respective discharge resistance R30 or R36. After the capacitors have been discharged, the contacts S5a and S5b may be opened to initiate a timing interval for each section of the timer circuit. In the present embodiment, the timing interval for the section of the timing circuit including relay S4 is designed for 10-second delay while the timing circuit section including relay S3 is designed for a 3-second delay. The timing delay in each section is substantially determined by the value of the series-connected resistance R29 in the case of capacitor C16 and resistances R33 and R34 for the capacitor C17.

At the initiation of the timing interval, relay S4 will be deenergized and its contacts S4a will be closed and a circuit will be completed between the two stages of the amplifier circuit 11. At the termination of the timing interval, the capacitor C17 will be charged to a required value for causing the unijunction transistor Q12 to switch to a conducting state and trigger the SCR Q14 to a conducting state thus energizing the actuating coil of relay S4. Relay S3 in the second timing circuit will also be deenergized at initiation of the timing interval and its contacts S3a and S3b will be closed. These contacts being closed will result in discharge of the integrating capacitors C5 and C14. When the timing capacitor C16 of this section of the timing circuit becomes charged to a predetermined value, the associated unijunction transistor Q11 will be switched to a conducting state and trigger the SCR Q13 to a conducting state. Thus, the actuating coil S3 will be energized and open the contacts S3a and S3b. At this time, the integrating capacitors C5 and C14 will be able to perform their respective functions of integrating the respective signals.

The 15-volt direct current power supply section is connected to the relay devices S3 and S4 through a manually-operated push button switch S2. This switch includes a normally open and a normally closed set of contacts, S2a and S2b, with the normally closed contacts being connected in series with the input terminal to the actuating coils of the relays S3 and S4. Thus, these relays will normally be energized during any Off-Duty period of operation of the test instrument. The initiation of a test cycle is effected by actuating the switch S2 to open the normally closed contacts S2b and close the normally open contacts S2a. The normally open contacts S2a are connected in series with the actuating coil of a relay S5 having the normally open contacts S5a and S5b. Thus, the switch S2, which may be identified as a "Push To Test" switch, will simultaneously deenergize the relays S3 and S4 while actuating relay S5 to discharge the timing capacitors C16 and C17 of the timer circuits.

A pair of indicator lights L2 and L3 may be provided to indicate the state of operation of the test instrument. The indicator light L2 is connected across a low-voltage alternating current power supply and is energized whenever the On-Off switch S1 is closed. The indicator light L3 is connected in series with a set of normally closed contacts S4b of the relay device S4. Thus, the indicator light L3 will only be illuminated when the timer circuit is in operation, that is, the relay device S4 is deenergized and a 10-second timing interval is in operation. At the conclusion of the 10-second timing operation, the light L3 will go off signifying that the timing interval has been completed and that the readout instruments which are the meters 15 and 21 are indicating their respective factors of relative energy and blows per minute.

The present embodiment of the circuit is illustrated in detail in FIGURE 6 and utilizes the following components:

| | |
|---|---|
| R1 | 50K |
| R2 | 3.3M |
| R3 | 4.7K |
| R4 | 820K |
| R5 | 10K |
| R6 | 330Ω |
| R7 | 2.2K |
| R8 | 1K |
| R9 | 1M |
| R10 | 4.7K |
| R11 | 3K |
| R12 | 100K |
| R13 | 4.7M |
| R14 | 3K |
| R15 | 100Ω |
| R16 | 1.5K |
| R17 | 47K |
| R18 | 10K |
| R19 | 47K |
| R20 | 3.3K |
| R21 | 4.7K |
| R22 | 3K |
| R23 | 2.2K |
| R24 | 470Ω |
| R25 | 10K |
| R26 | 3K |
| R27 | 470Ω |
| R28 | 330Ω |
| R29 | 180K |
| R30 | 1K |
| R31 | 100Ω |
| R32 | 2.2K |
| R33 | 250K |
| R34 | 270K |
| R35 | 330Ω |
| R36 | 1K |
| R37 | 100Ω |
| R38 | 47Ω |
| R39 | 100Ω |
| R40 (L1) Raytheon | 1123 |

| | Mfd. |
|---|---|
| C1 | 0.01 |
| C2 | .01 |
| C3 | 0.01 |
| C4 | 1.5 |
| C5 | 12.0 |
| C6 | 0.1 |
| C7 | 0.1 |
| C8 | 0.1 |
| C9 | 10.0 |
| C10 | .01 |
| C11 | .001 |
| C12 | 0.33 |
| C13 | 0.01 |
| C14 | 12.0 |
| C15 | 10.0 |
| C16 | 22.0 |
| C17 | 22.0 |
| C18 | 10.0 |
| C19 | 250.0 |
| C20 | 250.0 |
| C21 | 250.0 |

| | |
|---|---|
| Q1 | 2N3391A |
| Q2 | 2N697 |
| Q3 | 2N3391A |
| Q4 | 2N3391A |
| Q5 | 2N3391A |
| Q6 | 2N3391A |

| | |
|---|---|
| Q7 | 2N697 |
| Q8 | 2N697 |
| Q9 | 2N3391A |
| Q10 | 2N3391A |
| Q11 | 2N2646 |
| Q12 | 2N2646 |
| Q13 | C6F (GE) |
| Q14 | C6F (GE) |
| CR1 | 1N456 |
| CR2 | 1N456 |
| CR3 | 1N456 |
| CR4 | 1N456 |
| CR5 | 1N456 |
| CR6 | 1N456 |
| CR7 | 1N456 |
| CR8 | 1N456 |
| CR9 | 1N456 |
| CR10 | 1N456 |
| CR11 | 1N3193 |
| CR12 | 1N3193 |
| CR13 | 1N456 |
| CR14 | 1N456 |
| CR15 | 1N3193 |
| CR16 | 1N3193 |
| CR17 | 1N3193 |
| CR18 | Z4XL20 (GE) |
| CR19 | Z4XL20 (GE) |

To further clarify the operation of the test instrument, a brief description of operation in connection with the detailed schematic diagram of FIGURE 6 is provided. In this description, it is assumed that the accelerometer 10 is mechanically coupled to the test body or pavement P and is properly functioning to provide the electrical signal comprising a series of amplitude modulated pulses having an oscillatory waveform in response to the operation of the vibratory-type device T. It is also assumed that the test instrument has been connected to a suitable 115-volt alternating current power supply and the rectifier sections of the power supply are functioning to provide the proper direct current voltages of 40-volts and 15-volts to the respective portions of the circuit. At this time, the "Push To Test" switch S2 will be in the indicated normally closed position and the relay devices S3 and S4 will be energized and the respective contacts will be maintained in an open position. Thus, the light L2 will be illuminated indicating that the power supply of the test instrument has been energized and the light L3 will be off indicating that a test interval has not been initiated as the contacts S4a are open. The stages of the amplifier circuit 11 are disconnected and no signal will be transmitted to the remainder of the testing circuit. The integrating capacitors C5 and C14 in the respective integrating circuits may have a residual charge but this charge will be dissipated when a test cycle is initiated. During the time that the switch S2 remains in the position with the contacts S2b closed, the circuits will not provide any additional increase in the indication of the meters.

Initiation of a test cycle is effected by momentarily actuating the "Push To Test" switch S2 which closes the contacts S2a to energize the discharging relay S5 and discharge the respective timing capacitors C16 and C17. Simultaneously, the relay devices S3 and S4 will be de-energized and the respective contacts will be closed. The indicating light L3 will be illuminated indicating that the timing cycle has been initiated. Contacts S3a will be closed and complete the circuit between the two stages of the amplifier circuit 11 thus permitting transmission of elecrical input signal to the two indicating circuits. Closing of the contacts S3a and S3b of relay S3 will discharge the integrating capacitors C5 and C14 to the prescribed reference voltage. At the termination of the 3-second timing interval for the circuit associated with relay S3, the actuating coil S3 will be energized and open the contacts S3a and S3b. It is only after the contacts S3a and S3b have opened that the integrating capacitors C5 and C14 will funcion to provide the respective indications of relative energy and blows per minute. This 3-second delay in the initiation of the actual measurement interval is designed to assure that the automatic gain control circuit 16 will have an adequate time to stabilize. The timing cycle will continue until the termination of the 10-second interval as determined by the capacitor C17. When capacitor C17 has been charged to the predetermined value, the switching circuit will be actuated to trigger the silicon controlled rectifier Q14 to a conducting state and hus energize the actuating coil of relay S4. Energization of relay S4 will cause the contacts S4a and S4b to open. Opening of contact S4a will disconnect the two stages of the amplifier circuit 11 and prevent further passage of electrical signals to the two respective indicating circuits. Contact S4b will also open and extinguish light L3 indicating that the timing interval or measurement interval has been concluded and the readout is indicative of the respective energy or frequency.

The apparatus of this invention is utilized as previously described to provide the indications of relative energy and cyclic frequency of operation as expressed in blows per minute for the vibratory-type device being tested and for a similar device of known condition. This procedure provides indications of the relative operational effectiveness of the two devices which may then be compared. By selecting the device of known condition, the comparison of the respective indications will provide the necessary information to ascertain the condition of the device being tested and determine the necessary corrective action.

It will be readily apparent that the apparatus of this invention provides a useful determination of the operational effectiveness of a vibratory-type device, such as an air-powered hammer or tamper. This invention also provides a convenient method for determining the operational effectiveness of the type of device described herein. This method of relatively comparing the operation of an instrument under test with that of a stanadrd device having known operating characteristics provides a relatively accurate determination of the operational effectiveness. The apparatus may be embodied in relatively simple components which are economical to construct and are of a rugged nature to enhance the portability in its adaptation to testing applications. Also, the apparatus may be readily incorporated in a permanent test installation if desired.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An apparatus for determining the operational effectiveness of a vibratory-type device comprising an electromechanical transducer adapted to be disposed in mechanically coupled relationship to an operating vibratory-type device and being responsive to the mechanical oscillations produced to provide a related electrical signal pulse having an oscillatory waveform for each cycle of the mechanical oscillations produced, and electric circuit means electrically connected with said transducer and responsive to the electrical signals produced thereby and forming an output signal providing a relative indication of the energy output of the vibratory-type device, said circuit means including unidirectional circuit means connected with said transducer and operable to pass only that portion of the signal of selected polarity and a waveform integrating circuit having an input connected with said unidirectional circuit means for receiving the unidirectional signal components and being operable over a predetermined time interval to form an output signal related to the cumulative energy of the signal during said interval.

2. An apparatus according to claim 1 which includes additional electric circuit means electrically connected with said transducer and responsive to the electrical signals produced thereby and forming an output providing an indication of the cyclic rate of operation of the vibratory-type device.

3. An apparatus according to claim 1 wherein said transducer includes a voltage generator device responsive to the mechanical oscillations to produce an amplitude-modulated, pulse-type voltage signal having an oscillatory waveform for each mechanical oscillation and which is related to the energy output of the vibratory-type device being tested.

4. An apparatus according to claim 1 wherein said circuit means includes a visual readout device responsive to said output signal.

5. An apparatus according to claim 2 wherein said additional circuit means includes a trigger circuit responsive to a signal of oscillatory waveform produced by each mechanical oscillation and forming a single-pulse signal of predetermined form therefor, and pulse-counting means responsive to said single-pulse signals and being operable over a predetermined time interval to form an output signal which is proportional to the cumulative total of said single-pulse signals during said interval.

6. An apparatus for determining the operational effectiveness of a vibratory-type device comprising an electromechanical transducer adapted to be disposed in mechanically coupled relationship to an operating vibratory-type device producing a mechanical oscillation of amplitude-modulated, pulse form for each cycle of operation of the device, said transducer being responsive to the mechanical oscillations and forming a related electrical signal pulse of amplitude-modulated, oscillatory waveform for each mechanical oscillation, and an electric circuit electrically connected with said transducer and responsive to said signal pulse formed by said transducer and forming an output signal related to the energy output of the vibratory-type device, said electric circuit including unidirectional circuit means connected with said transducer to pass only that portion of said signal pulse of selected polarity and an electronic waveform integrator circuit having an input connected with said unidirectional circuit means for receiving the rectified components of said signal pulse and forming said output signal.

7. An apparatus according to claim 6 wherein said electromechanical transducer comprises a piezoelectric crystal supported for response to mechanical oscillations.

8. An apparatus according to claim 7 wherein said piezoelectric crystal is of elongated, bar-form and is of a type responsive to bending forces, said crystal being supported in a mounting structure with the bending axis disposed transversely to the direction of movement of the mechanical oscillations.

9. An apparatus according to claim 6 wherein said electrical circuit includes second circuit means responsive to the electrical signal output of said transducer and forming an output signal quantitatively related to the cyclic frequency of operation of the vibratory-type device.

10. An apparatus according to claim 9 wherein said second circuit means includes an electronic pulse counting integrator operative to provide an output signal related to number of signal pulses received during a predetermined time interval, and timing means for determining the time interval.

11. The method of determining the relative operational effectiveness of a vibratory-type device consisting of alternately operating the device being tested and a second similar device having a known operational effectiveness in association with a test body capable of transmitting mechanical oscillations with said devices imparting a mechanical oscillation of amplitude-modulated, pulse form to the test body for each cycle of operation of the respective device being operated, detecting the mechanical oscillations imparted to the test body at a point remote to the point of application of the devices with an electromechanical transducer coupled with the test body and, for each mechanical oscillation, forming an electrical signal comprising an amplitude-modulated pulse of oscillatory waveform which is related to the mechanical oscillation, rectifying said signal pulse, determining the relative energy of at least one electrical signal pulse for each device by integrating circuit means responsive to said rectified signal pulse and providing a quantitative output signal related thereto and indicative of the energy output of the respective device, and quantitatively comparing the output signal for the device being tested with the output signal for the second device having a known operational effectiveness to determine the relative operational effectiveness of the device being tested.

12. The method of determining the relative operational effectiveness of a vibratory-type device according to claim 11 which includes detecting the electrical signal pulses produced by operation of the device being tested over a predetermined interval and forming an output signal indicative of the cyclic frequency of operation.

References Cited

UNITED STATES PATENTS

| | | | |
|---|---|---|---|
| 2,405,059 | 7/1946 | Sahmel | 73—67 XR |
| 2,505,601 | 4/1950 | Bender et al. | |
| 2,690,489 | 9/1954 | Jarret et al. | 73—71.4 XR |
| 2,754,679 | 7/1956 | Petroff | 73—71.4 |
| 2,928,668 | 3/1960 | Blasingame | 73—71.2 XR |
| 3,186,237 | 6/1964 | Forrest | 310—8.4 XR |

FOREIGN PATENTS 659,400   3/1963   Canada.

OTHER REFERENCES

Raymond R. Bouche: Standard on Shock and Vibration Instruments and Control Systems, August 1961, pp. 1451, 1452.

RICHARD C. QUEISSER, *Primary Examiner.*

JOHN P. BEAUCHAMP, JR., *Assistant Examiner.*